United States Patent
Kecman et al.

(10) Patent No.: US 7,469,065 B2
(45) Date of Patent: Dec. 23, 2008

(54) METHOD, APPARATUS AND SOFTWARE FOR LOSSY DATA COMPRESSION AND FUNCTION ESTIMATION

(75) Inventors: Vojislav Kecman, Auckland (NZ); Jonathan Robinson, Christchurch (NZ)

(73) Assignee: Auckland UniServices Limited, Auckland (NZ)

( * ) Notice: Subject to any disclaimer, the term of this patent is extended or adjusted under 35 U.S.C. 154(b) by 640 days.

(21) Appl. No.: 10/495,607

(22) PCT Filed: Nov. 14, 2002

(86) PCT No.: PCT/NZ02/00251

§ 371 (c)(1),
(2), (4) Date: Nov. 19, 2004

(87) PCT Pub. No.: WO03/050959

PCT Pub. Date: Jun. 19, 2003

(65) Prior Publication Data

US 2005/0066075 A1    Mar. 24, 2005

(30) Foreign Application Priority Data

Nov. 15, 2001 (NZ) ..................................... 515527

(51) Int. Cl.
  G06K 9/62 (2006.01)
  G06K 9/36 (2006.01)
  H04B 1/66 (2006.01)
  H04N 7/12 (2006.01)
  H04N 1/32 (2006.01)
(52) U.S. Cl. ....................... 382/232; 382/155; 375/240; 348/384.1; 358/426.01; 358/538
(58) Field of Classification Search ......... 382/155–161, 382/232–253; 358/538, 426.01–426.16; 348/384.1–419.1; 375/240–241
See application file for complete search history.

(56) References Cited

U.S. PATENT DOCUMENTS 5,005,206 A    4/1991    Naillon et al.

(Continued)

FOREIGN PATENT DOCUMENTS

WO    WO 01/65395    9/2001

OTHER PUBLICATIONS

Zhongshu Ji; Tanaka, K.; Kitamura, S., "Block permutation coding of images using cosine transform," Communications, IEEE Transactions on, vol. 43, No. 11, pp. 2833-2846, Nov. 1995.*

(Continued)

*Primary Examiner*—Bhavesh M Mehta
*Assistant Examiner*—Manav Seth
(74) *Attorney, Agent, or Firm*—Fish & Richardson P.C.

(57) ABSTRACT

There is provided a method of producing compressed data including the steps of receiving input data to be compressed (step 10), transforming said input data into a sum of basis functions multiplied by a corresponding set of coefficients, which may be a transformation to the frequency domain (step 12), forming a function or row of data from said set of coefficients (step 17), estimating the function using a learning process (step 21) and recording the resulting estimate (step 28) as the compressed data. Also provided is a method of estimating a function which may be used in the method of producing compressed data including inverting the function about a predetermined value (step 18) prior to using a learning process to estimate the function. Apparatus (1) for implementing the method and a software product to cause a processing means to implement the method are also claimed.

31 Claims, 8 Drawing Sheets

U.S. PATENT DOCUMENTS

| | | | | |
|---|---|---|---|---|
| 5,148,272 | A | * | 9/1992 | Acampora et al. ....... 375/240.1 |
| 5,313,534 | A | * | 5/1994 | Burel .......................... 382/238 |
| 5,553,159 | A | * | 9/1996 | Takeo .......................... 382/156 |
| 5,754,676 | A | * | 5/1998 | Komiya et al. .............. 382/132 |
| 5,892,847 | A | * | 4/1999 | Johnson ...................... 382/232 |
| 5,950,146 | A | | 9/1999 | Vapnik |
| 6,038,346 | A | | 3/2000 | Ratnakar |
| 6,125,201 | A | * | 9/2000 | Zador .......................... 382/166 |
| 6,128,608 | A | | 10/2000 | Barnhill |
| 6,134,344 | A | | 10/2000 | Burges |
| 6,832,006 | B2 | * | 12/2004 | Savakis et al. .............. 382/239 |

OTHER PUBLICATIONS

Sikora, T., "MPEG digital video-coding standards," Signal Processing Magazine, IEEE, vol. 14, No. 5, pp. 82-100, Sep. 1997.*

Amerijckx, et al., "Image Compression by Self-Organized Kohonen Map", *IEEE Transactions on Neural Networks*, 9(3):503-507, May 1998.

Hadzic, et al., "Support Vector Machines Trained by Linear Programming: Theory and Application in Image Compression and Data Classification", *5th Seminar on Neural Network Application in Electrical Engineering, Neurel 2000*, Faculty of Electrical Engineering, University of Belgrade, Yugoslavia, Proceedings, pp. 18-23, 2000.

Popat, Kris, "Lossy Compression of Grayscale Document Images by Adaptive-Offset Quantization", *Proc. of IS&T/SPIE Electronic Imaging 2001: Document Recognition and Retrieval VIII*, Jan. 2001.

Robinson, et al., "The Use of Support Vector Machines in Image Compression", *Proc. of the EIS'2000, Second International ICSC Symposium on Engineering of Intelligent Systems*, Jun. 27-30, 2000, at the University of Paisley, Scotland, U.K.

* cited by examiner

Error

METHOD, APPARATUS AND SOFTWARE FOR LOSSY DATA COMPRESSION AND FUNCTION ESTIMATION

TECHNICAL FIELD

The present invention relates to methods, apparatus and software for use in lossy data compression and to function estimation. In particular, but not exclusively, the present invention relates to still and moving image compression and/or sound and audio data compression using learning processes.

BACKGROUND ART

The use of data compression has become increasingly important for information communication and storage given the now massive amounts of information communicated and stored electronically world-wide. By more effectively compressing data, bandwidth in communication channels and/or memory space in storage systems can be freed, allowing increased communication and/or storage capacity respectively.

The ISO/IEC 10918-1 standard, commonly referred to as JPEG has become probably the most popular form of image compression. However, JPEG becomes increasingly less effective for lossy compression at ratios exceeding approximately 30:1.

A compression method that results in improved quality of image restoration over JPEG compression for compression ratios exceeding 30:1 has been presented in C. Amerijckx et al. "Image compression by self-organized kohonen map", IEEE Transactions on Neural Networks, vol. 9, no. 3, May 1998. This method involves transforming the image data using the discrete cosine transform (DCT), vector quantizing the DCT coefficients by a topological self-organising map (Kohonen map), differential coding by a first order predictor and entropic encoding of the differences.

In the specification of U.S. Pat. No. 5,950,146, the use of support vectors in combination with a neural network is described to assist in overcoming the problem of exponential increases in processing requirements with linear dimensional increases in estimations of functions. The method involves providing a predetermined error tolerance, which is the maximum amount that an estimate function provided by a neural network may deviate from the actual data.

The advantage of using support vector machines to alleviate the problem of disproportionate computational increases for dimensional increases for image compression was identified in: J. Robinson and V. Kecman, "The use of support vectors in image compression", Proceedings of the 2nd International Conference on Engineering Intelligent Systems, University of Paisley, June 2000. The use of support vector machines goes some way to providing improved image quality relative to that obtained from JPEG compression for compression ratios greater than 30:1.

Neural networks have also been used for image compression; see for example the specification of U.S. Pat. No. 5,005,206. After the image is defined by a suitable function, which is typically a transformation of the image data into a different domain, a neural network is trained on the function to produce an estimate of the function. The image is reconstructed from the weights of the neural network.

A problem with neural networks is that for highly varying data, the error of the resulting estimate may be substantial. To reduce the error, a large number of points may be considered. However, this increases the computational burden and decreases compression. Even using support vectors, the computational burden to enable a solution to be computed within a required error may be prohibitively high.

Thus, it is an object of the present invention to provide a method, apparatus and/or software product that provide improved accuracy in data compression and/or in function estimation over existing methods, apparatus and software for comparative processing effort, or at least to provide the public with a useful alternative.

Further objects of the present invention may become apparent from the following description.

Any discussion of the prior art throughout the specification should in no way be considered as an admission that such prior art is widely known or forms part of common general knowledge in the field.

SUMMARY OF THE INVENTION

According to a first aspect of the invention, there is provided a method of producing compressed data including the steps of:
a) receiving input data to be compressed;
b) transforming said input data into a sum of basis functions multiplied by a corresponding set of coefficients;
c) forming a function from said set of coefficients;
d) estimating said function using a learning process and recording the resulting estimate;

wherein said estimate defines the compressed data.

Preferably, the method may further include subdividing input data received in step a) into a number of portions and performing steps b) through d) on each of said portions.

Preferably, the step of forming a function from said set of coefficients may include first removing a DC component from each said portion and recording the DC components as part of the compressed data.

Preferably, the method may further include encoding said DC components prior to recording them as part of the compressed data.

Preferably, the step of forming a function may include:
i) defining a first function as a series of said coefficients alternating about a predetermined value;
ii) creating a second function by inverting identified portions of the first function on one side of the predetermined value and recording inversion information defining the portions that have been inverted;

wherein said second function defines the function to be estimated in step d).

Preferably, the learning process identifies a series of basis vectors and wherein the method may further include associating each basis vector with a corresponding coefficient in said function.

Preferably, the method may further include discarding the inversion information for any coefficient that does not have an associated basis vector.

Preferably, the method may further include discarding weights calculated by the learning process that do not have an associated basis vector.

Preferably, the method may further include discarding the inversion information for any coefficient where one or both of its absolute value and reconstructed is less than a predetermined magnitude.

Preferably, the method may including storing the basis vectors as a data series, wherein the position of a value in the data series defines the basis vector and the value defines the basis vector's weight.

Preferably, the method may include shifting the values in the data series so that all the values that have not been discarded have the same sign and are non-zero, recording the value by which the values have been shifted as part of the compressed data and combining the basis vectors with the inversion information by changing the sign of the values dependent on the inversion information.

Preferably, the method may include encoding the data series using entropy encoding.

Preferably, the step of transforming said input data into a sum of basis functions multiplied by a corresponding set of coefficients may include applying the discrete cosine transform to the input data.

Preferably, the input data may define a two-dimensional image.

According to a second aspect of the invention there is provided a method of creating information defining an estimate of a function, the method including:
i) receiving input information including a number of values defining a first function, wherein the first function is to be estimated;
ii) creating a second function by inverting identified portions of the first function on one side of a predetermined value and recording inversion information defining the portions that have been inverted;
iii) estimating said second function using a learning process and recording information defining a resulting estimate;

wherein the resulting estimate and inversion information are collectively the information defining an estimate of the first function.

Preferably, the learning process may compute a series of basis vectors and the method includes associating each basis vector with a corresponding value in said second function.

Preferably, the method may further include discarding the inversion information for any value that does not have an associated basis vector.

Preferably, the method may further include discarding weights computed by the learning machine training that do not have an associated basis vector.

Preferably, the method may further include discarding the inversion information for any coefficient where one or both of its absolute value and reconstructed is less than a predetermined magnitude.

Preferably, the method may include storing the basis vectors as a data series, wherein the position of a value in the data series defines the basis vector and the value defines the basis vector's weight.

Preferably, the method may include shifting the values in the data series so that all the values that have not been discarded have the same sign and are non-zero, recording the value by which the values have been shifted as part of the information defining an estimate of the first function and combining the basis vectors with the inversion information by changing the sign of the values dependent on the inversion information.

Preferably, the method may include encoding the data series using entropy encoding.

According to a third aspect of the present invention, there is provided computerised apparatus for producing compressed data, the computerised apparatus including receiving means to receive input data to be compressed and processing means operable to:
a) transform said input data into a sum of basis functions multiplied by a corresponding set of coefficients;
b) form a function from said set of coefficients;
c) estimate said function using a learning process;

wherein said estimate defines the compressed data.

Preferably, the processing means may be operable to form a function by:
i) defining a first function as a series of said coefficients alternating about a predetermined value;
ii) creating a second function by inverting identified portions of the first function on one side of the predetermined value and recording inversion information defining the portions that have been inverted;

wherein said second function defines the function to be estimated in step c).

Preferably, the computerised apparatus may be used to compress image or sound information, wherein the processing means is operable to transform image information from the spatial domain to the frequency domain to create said set of coefficients.

According to a fourth aspect of the present invention, there is provided computerised apparatus for creating information defining an estimate of a function, the computerised apparatus including receiving means for receiving input information including a number of values defining a first function, wherein the first function is to be estimated and processing means operable to:
i) create a second function by inverting identified portions of the first function on one side of a predetermined value and recording inversion information defining the portions that have been inverted;
ii) estimate said second function using a learning process and recording information defining a resulting estimate;

wherein the resulting estimate and inversion information are collectively the information defining an estimate of the first function.

According to a fifth aspect of the present invention, there is provided a software product for producing compressed data, the software product including an instruction set including instructions to cause a processing means or a combination of processing means to:
a) transform said input data into a sum of basis functions multiplied by a corresponding set of coefficients;
b) form a function from said set of coefficients;
c) estimate said function using a learning process;

wherein the estimate defines the compressed data.

According to a sixth aspect of the present invention, there is provided a software product for determining an estimate of a function, the software product including an instruction set including instructions to cause a processing means or a combination of processing means to:

i) receive information defining a first function, wherein the first function is to be estimated;
ii) create a second function by inverting identified portions of the first function on one side of a predetermined value and recording inversion information defining the portions that have been inverted;
iii) estimate said second function using a set of parameters than number less than the number of values in said input information and recording information defining the resulting estimate;

wherein the resulting estimate and inversion information are collectively the information defining an estimate of the first function.

According to a seventh aspect of the present invention, there is provided a computer readable medium containing the software product as described in either of the two immediately preceding paragraphs.

Further aspects of the present invention, which should be considered in all its novel aspects, may become apparent from the following description, given by way of example only and with reference to the accompanying drawings.

MODES FOR CARRYING OUT THE INVENTION

The present invention provides a method of data compression and a method of function estimation, which may be used in the method of data compression. The invention may have particular application to the compression of two-dimensional black-white or colour still or moving images and the following description is given by way of example with particular reference to this application. However, those skilled in the relevant arts will recognise that the invention may have alternative applications in the field of statistical learning. Such alternative applications may include compression of audio data files, pattern recognition, modelling of complex systems, search algorithms, data filtering and decision making systems.

In the application of two dimensional image compression, the invention involves first transforming the image from the spatial domain into a sum of basis functions multiplied by a corresponding set of coefficients. The component weights or coefficients of the transformed data are then expressed as a function (coefficient function) and a learning process is applied to the coefficient function. In one embodiment, the method includes the aspect of the invention used for function estimation, which includes inverting portions of the coefficient function in order to result in a second function that is more accurately modelled by a learning process for the same number of model parameters. A record is kept of the portions of the coefficient function that are inverted and this record is used during reconstruction of the image.

Figure 1:
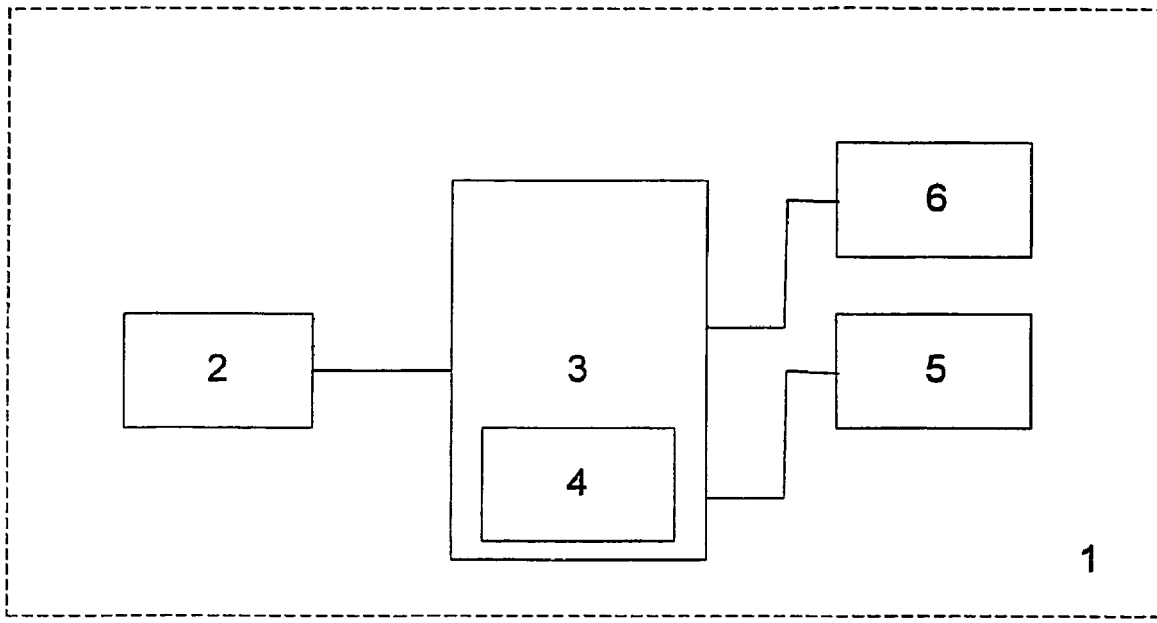
FIG. 1: Shows a block diagram representation of a computational environment in which the present invention may be implemented.

FIG. 1 shows a block diagram representative of a possible computation system 1 that may be used to implement the compression method of the present invention. The computation system 1 includes an input/output (I/O) interface 2 to receive image data, which may be a single communication channel or multiple communication channels. A processor 3, including a learning machine 4 is in communication with the I/O interface 2. The processor 3 stores the image data in memory 5 and performs the processing steps as described herein below according to algorithms stored in program memory 6. The learning machine 4 performs the learning process and outputs the results to memory, for example to memory 5 and/or outputs the results to an output, for example I/O interface 2. Memory 5 and program memory 6 may be any suitable computer readable medium, readable by the processor 3. Also, the processor 3 may be any suitable processing means including microprocessors, digital signal processors, microcontrollers or customised hardware.

Figure 2:
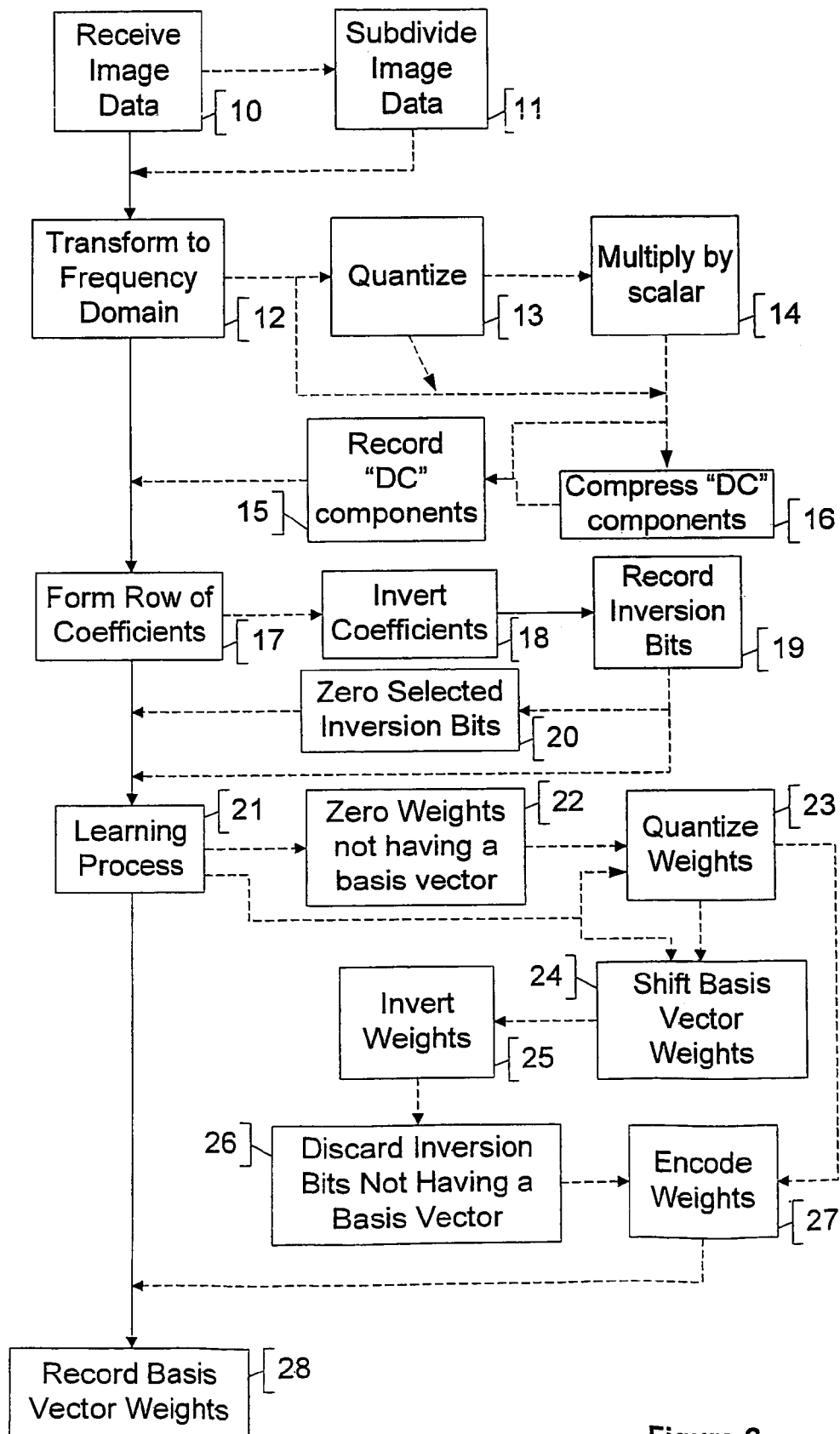
FIG. 2: Shows a flow diagram of the steps to compress an image in accordance with one embodiment of the present invention.

FIG. 2 shows a flow chart of the steps that may be performed by the computational system 1 to compress a two-dimensional image in accordance with the present invention. The image to be compressed is first received as data through the I/O interface 2 and stored in memory 5 (step 10). Optionally, the image may be subdivided into blocks, for example by subdividing the image data into 8×8 matrices (step 11) prior to further processing. Where an image is not an integral number of 8×8 blocks, the image can be "padded" with white pixels to expand it to an integral of 8×8 blocks. Step 11 may be advantageous for spatial to frequency transformations that are more efficient on smaller images, such as the discrete cosine transform (DCT).

In the preferred embodiment of the invention, each block is then transformed to the frequency domain (step 12). An 8×8 matrix of DCT coefficients is produced for each block. The discrete cosine transform (DCT) may be used as the spatial to frequency transformation. For 2-dimensional images, the 2-D DCT shown in equation (1) is used.

$$T[i, j] = c(i, j) \sum_{x=0}^{N-1} \sum_{y=0}^{N-1} V[x, y] \times \cos\frac{(2y+1)i\pi}{2N} \times \cos\frac{(2x+1)i\pi}{2N} \quad \text{equation (1)}$$

Where:

$$c(i, j) = \frac{2}{N}, i \text{ and } j \neq 0$$

$$c(i, j) = \frac{1}{N}, i \text{ and } j = 0$$

Other spatial to frequency transformations may be applied, including the Fourier transform or wavelet transformation. In addition, other transformations that convert the spatial domain data into a set of coefficients for a basis function may be used, for example using a wavelet transformation. However, a transformation to the frequency domain is preferred due to the way humans perceive visual information. Where other forms of input data, such as audio data is used, an appropriate transformation is used to transform that data to the frequency domain.

By performing a spatial to frequency transformation such as the DCT, advantage is taken of the way the human eye perceives images. The advantage results from the tendency of the magnitude of the frequency components to diminish in an image with higher frequency. As the higher frequency components are less visible to the eye, they can be removed with little noticeable effect on the image quality.

Figure 3:
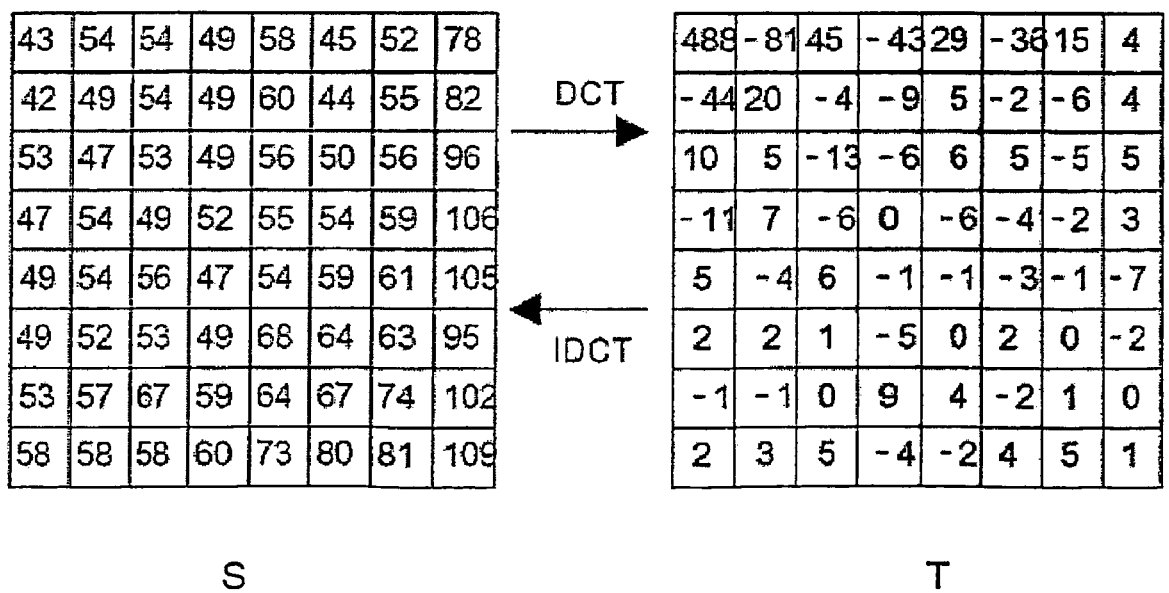
FIG. 3: Shows a matrix defining an 8×8 block of image data in the spatial domain and a matrix defining the same block in the frequency domain.

An example transformation of an 8×8 matrix is shown in FIG. 3. Matrix S is the spatial domain matrix and matrix T is the corresponding frequency domain matrix, specifying the coefficients resulting from the computation of the DCT. The spatial domain matrix may be reconstructed from the frequency domain matrix using the inverse discrete cosine transform (IDCT) shown in equation (2).

$$V[x, y] = \sum_{x=0}^{N-1} \sum_{y=0}^{N-1} c(i, j) T[i, j] \cos\frac{(2y+1)i\pi}{2N} \times \cos\frac{(2x+1)j\pi}{2N} \quad \text{equation (2)}$$

Where:

$$c(i, j) = \frac{2}{N}, i \text{ and } j \neq 0$$

$$c(i, j) = \frac{1}{N}, i \text{ and } j = 0$$

The magnitude of the higher frequency components may be reduced by dividing the elements in the transformed matrix T by the elements in a quantization matrix (step 13). This process is similar to that which is performed for the JPEG standard. To increase the compression, elements in a quantization matrix may be multiplied by a single coefficient before dividing the transformed matrix (step 14). Having performed this transformation, the top left component of the transformed matrix may be termed the "DC" coefficient or component and the remaining components of the transformed matrix the "AC" components.

Figure 4:
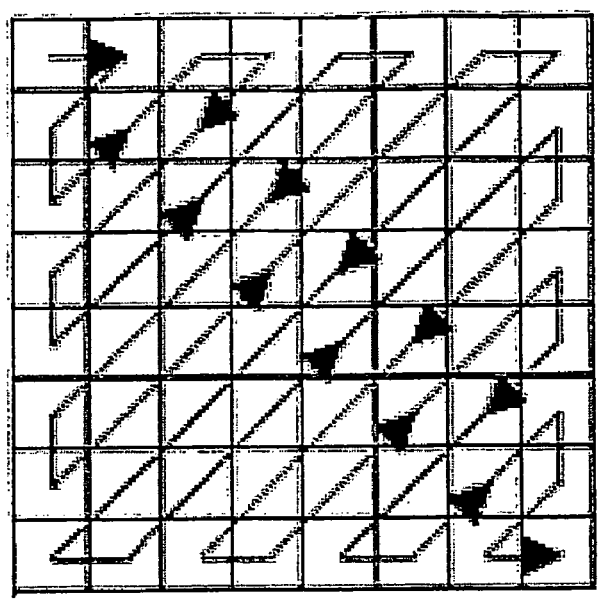
FIG. 4: Shows a zig-zag pattern through an 8×8 block used to form a function in accordance with an aspect of the present invention.

In order to obtain a function that may be modelled by a learning processor, a sequence of values, or row R is required. To form this row R, a sequence of values may be formed by following a zigzag pattern through the matrix T (step 17). Using this pattern, which is shown in FIG. 4, the importance of each coefficient is proportional to its position in the sequence. The top left co-efficient of the matrix is the "DC" component and can be interpreted as setting the average colour of the block defined the matrix. The DC component for each matrix may be removed from the row and recorded separately (step 15) and the data defining the DC components may be compressed using entropy encoding (step 16). Lossless or lossy data compression may be used for the DC components depending on requirements for the compression process.

In an alternative embodiment, the DC components may remain part of the row. However, this may reduce the quality of compression.

For the matrix T shown in FIG. 3, a row R formed by following the abovementioned zigzag pattern and with the DC component removed is: R1 (partially shown)=[−81, −44, 10, 20, 45, −43, −4 . . . −2, 0, 5, 1]. The row R and DC component for each matrix subdivided from the image data in step 11 is stored in the memory 5 of the computational system 1. If the DC components are encoded, the resultant encoded data may replace the actual DC components in the memory 5.

Figure 5:
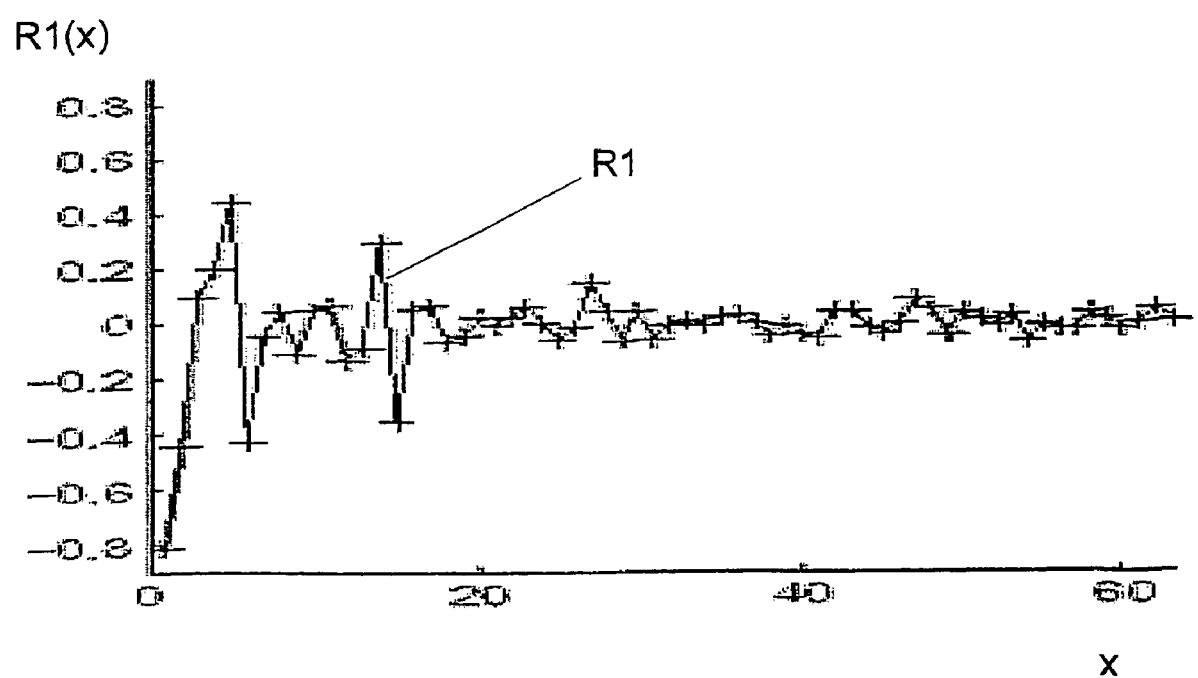
FIG. 5: Shows a plot of the function formed by following the zig-zag pattern of FIG. 4 along matrix T in FIG. 3.
Figure 6:
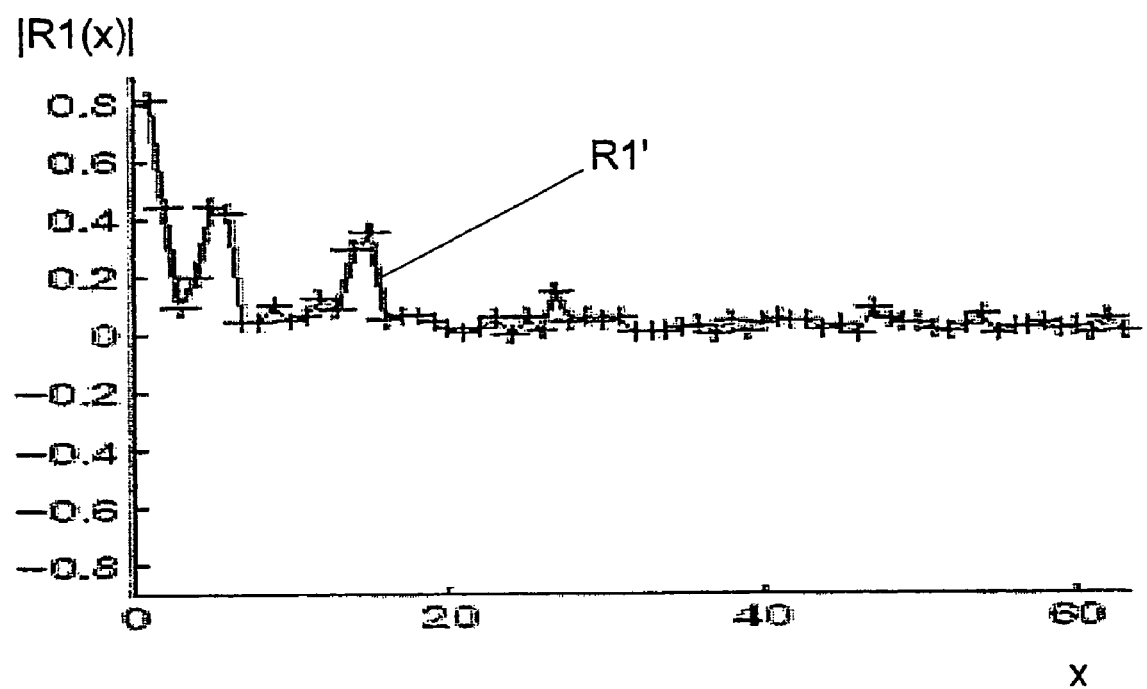
FIG. 6: Shows a plot of the absolute value of the function in FIG. 5.

FIG. 5 shows a plot of the row R1 formed from the 63 components (the "DC" component omitted), formed by the DCT of a normalised matrix S, normalised to be between −1 and 1 from the original colour range of 0 to 255. The independent variable x represents the position of the component in the row R1. Resulting from the transformation to the frequency domain, the magnitude of the DCT coefficients R1 (x) generally decrease further along the row. However, the sign (whether R1 (x) is positive or negative) appears relatively random along the row, causing a large swing in the input data. FIG. 6 shows a plot of the absolute value of the row R1. FIG. 6 shows a plot of a row R1', which is the absolute value of the row R1. The plot has a smoother profile, which is better suited to estimation by a learning process. Therefore, in a preferred embodiment the absolute value of each DCT coefficient in the row R is computed and stored to form R' (step 18).

Although it is convenient to use the absolute value of the function so that the values less than zero are inverted, the function may be inverted about another predetermined value as required. Alternative values from zero may be selected to obtain a smoother row R'.

If the image is to be compressed on the basis of an estimate of a row R' of absolute values, then to accurately reconstruct the image, there should be a way of identifying and recording which coefficients were inverted (step 19). For discrete or digital information, a convenient means of reporting when a value in the function has been inverted is by a single bit. For example, a "1" may represent that the value has been inverted and a "0" may represent that the value has not been inverted.

This information is also recorded in a row I for use in reconstructing the image when required. For the row R1, the corresponding row I1 would be: I1 (partially shown)=[1, 1, 0, 0, 0, 1, 1 . . . 1, 0, 0, 0].

In an optional additional step to increase compression, any recovered value of the DCT coefficient that has an absolute value less than a predefined error value may have its inversion bit set to zero (step 20). That is, for recovered values close to zero the inversion bit may be discarded. In an alternative embodiment, the magnitude of the original DCT coefficients, rather than the recovered DCT coefficients may be used. This may be preferred in some cases in order to reduce the computation time for the compression.

Once the row R1 has been finalised in steps 17 through 20, the learning machine 4 is used to apply a learning process to the row R1 in order to provide an estimate of row R1 using less parameters (step 21). Any suitable learning process may be used, including:
  a) neural networks, particularly radial basis function (RBF) networks and multilayer perceptrons;
  b) kernel based models;
  c) wavelet networks;
  d) support vector machines;
  e) coordinate ascent based learning (Kernel AdaTron or Successive Over-Relaxation);
  f) Fourier or polynomial series modelling; and
  g) quadratic programming (QP) or linear programming (LP) based learning.

Those skilled in the relevant arts will appreciate that other suitable learning processes exist or may be developed that may be used with the present invention.

Kernel AdaTron and support vector machines (SVM's) otherwise known as kernel machines may be used as the learning machine 4. Each of these techniques is described by way of example herein below.

Initially developed for solving classification problems, SVM techniques can be successfully applied in regression, i.e. for functional approximation problems, see for example U.S. Pat. No. 5,950,146 (Vapnik), the contents of which are hereby incorporated herein in their entirety. Unlike pattern recognition problems where the desired outputs $y_i$ are discrete values, in data compression applications real valued functions are dealt with.

The general regression learning problem is set as follows—the learning machine is given/training data from which it attempts to learn the input-output relationship (dependency, mapping or function) f(x). A training data set:

$$D=[x(i),y(i)] \in R^n \times R^n, i=1, \ldots, l$$

consists of l pairs $(x_1; y_1); (x_2; y_2);; (x_l; y_l)$, where the inputs x are n-dimensional vectors $x \in R^n$ and system responses $y \in R^n$, are continuous values. The SVM considers approximating functions of the form shown in equation (3).

$$f(x, w) = \sum_{i=1}^{N} w_i \phi_i(x) \qquad (3)$$

where the functions $\phi_i(x)$ are called features, kernels or basis functions. Equation (3) is a SVM model where N is the number of support vectors. In the case of SVM regression, one uses Vapnik's linear loss function, equation (4) with ε-insensitivity zone as a measure of the error of approximation, $$|y - f(x, w)| = \begin{cases} 0 & \text{if } |y - f(x, w)| \leq \epsilon \\ |y - f(x, w)| - \epsilon, & \text{otherwise.} \end{cases} \qquad (4)$$

If the predicted value is within the ε-insensitivity zone the loss (error or cost) is zero. For all other predicted points outside the ε-insensitivity zone, the loss equals the magnitude of the difference between the predicted value and the radius ε of the tube.

In solving regression problems SVM performs linear regression in n-dimensional feature space using the ε-insensitivity loss function. At the same time, it tries to reduce model capacity by minimizing $\|w\|^2$, in order to ensure better generalization. All these are achieved by minimizing equation (5):

$$R_{w,\xi,\xi^*} = \frac{1}{2}\|w\|^2 + C\left(\sum_{i=1}^{l} \xi + \sum_{i=1}^{l} \xi^*\right) \qquad (5)$$

under constraints:

$$y_i - f(x, w) \leq \epsilon + \xi$$

$$f(x, y) - y_i \leq \epsilon + \xi^*$$

$$\xi \geq 0$$

$$\xi^* \geq 0$$

where ξ and ξ* are optional slack variables for measurements 'above' and 'below' an ε-insensitivity zone respectively.

Both slack variables are positive values and they measure the deviation of the data from the prescribed ε-insensitivity zone. If used, their magnitude can be controlled by a penalty parameter C. This optimization problem is typically transformed into the dual problem, and its solution is given by equation 6.

$$f(x, y) = \sum_{i=1}^{N_{SV}} (\alpha_i^* - \alpha_i) G(x_i, x) \qquad (6)$$

$$0 \leq \alpha_i^* \leq C_i$$

$$0 \leq \alpha_i \leq C.$$

Where $\alpha_i$ and $\alpha_i^*$ are the Lagrange multipliers corresponding to ξ and ξ*, $N_{SV}$ is the number of support vectors and G(xi; x) is the kernel function. The constant C influences a trade-off between an approximation error and the weight vector norm $\|w\|$ and is a design parameter that is chosen by the user. An increase in C penalizes larger errors (large ξ and ξ*) and in this way leads to an approximation error decrease. However, this can be achieved only by increasing the weight vector norm $\|w\|$. At the same time, an increase in $\|w\|$ does not guarantee a small generalization performance of a model.

Another design parameter which is chosen by the user is the required precision embodied in an ϵ value that defines the size of an ϵ-insensitivity zone.

There are a few learning parameters in constructing SVM's for regression. The two most relevant are the ϵ-insensitivity zone and the penalty parameter C if used. Both parameters should be chosen by the user. Increase in the ϵ-insensitivity zone means a reduction in requirements on the accuracy of approximation. It decreases the number of support vectors, leading to an increase in data compression. A detailed mathematical description of SVMs is referred to in: (a) V. N. Vapnik, The Nature of Statistical Learning Theory, Springer, 1995; (b) V. N. Vapnik, Statistical Learning Theory, John Wiley & Sons, Inc., 1998; and (c) V. Kecman, Learning and Soft Computing: support vector machines, neural networks and fuzzy logic models, The MIT Press, 2001.

Figure 11:
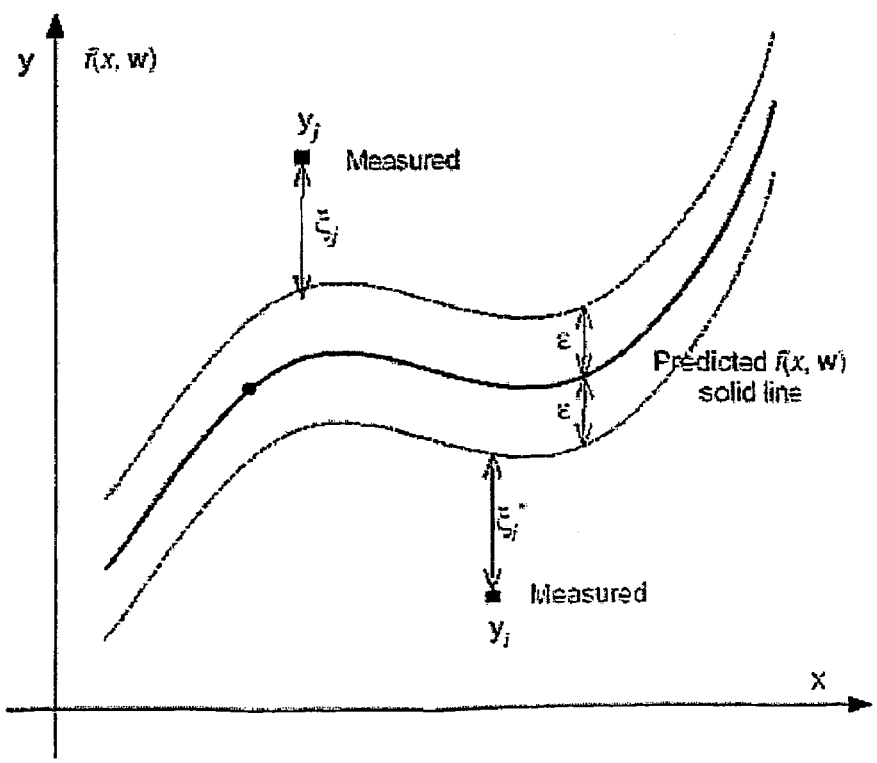
FIG. 11: Shows a graphical representation of the variables used in a learning machine training process.

FIG. 11 shows graphically the variables referred to above, in particular the ϵ-insensitivity zone and slack variables $\xi$ and $\xi^*$.

Support vector machine learning typically uses quadratic programming to solve the optimisation problem in equation (6). While this produces the desired result, quadratic programming is computationally expensive resulting in even a moderate sized image requiring a few minutes to compress. Equation (6) may be transformed into a linear optimisation problem which can be solved using Non Negative Least Squares (NNLS). NNLS which typically requires only a few seconds to solve compared with a quadratic programming solution requiring a few minutes.

In a second embodiment of the present invention, the basis (support) vectors may be identified using gradient ascent learning with clipping. This method is an alternative to the NNLS solution described above in relation to support vector machine learning. Gradient ascent learning with clipping belongs to the class of learning machines known as kernel. AdaTrons. The learning is preformed in dual space and defined as the maximization of the dual Lagrangian shown in equation (7).

$$L_d(\alpha, \alpha^*) = -\varepsilon \sum_{i=1}^{l} (\alpha_i^* + \alpha_i) + \sum_{i=1}^{l}(\alpha_i^* - \alpha_i)y_i - \frac{1}{2}\sum_{i,j=1}^{l}(\alpha_i^* - \alpha_i)(\alpha_j^* - \alpha_j)K(x_i, x_j), \quad (7)$$

Where ϵ is a prescribed size of the insensitivity zone, and $\alpha_i$ and $\alpha_i^*$ (i=1, I) are Lagrange multipliers for the points above and below the regression function respectively.

Learning results in I Lagrange multiplier pairs $(\alpha, \alpha^*)$. $\alpha_i$ (and $\alpha_i^*$), which correspond to the slack variables $\xi$ (and $\xi^*$) for SVM learning, will be nonzero values for training points on or 'above' (and on or 'below') an ϵ-insensitivity zone. Because no training data can be on both sides of the ϵ-insensitivity zone, either $\alpha_i$ or $\alpha_i^*$ will be nonzero. For data points inside the ϵ-insensitivity zone, both multipliers will be equal to zero. After learning, the number of nonzero parameters $\alpha_i$ or $\alpha_i^*$ is equal to the number of basis vectors. Because at least one element of each pair $(\alpha_i, \alpha_i^*)$, i=1, I, is zero, the product of $\alpha_i$ and $\alpha_i^*$ is always zero.

The dual Lagrangian $L_d$ as given in equation (7) will be maximized by a series of iterative steps until the predefined accuracy conditions are not satisfied.

Kernel AdaTron learning in solving regression task here is defined as the gradient ascent update rules for $\alpha_i$ and $\alpha_i^*$ shown in equations (8a) and (8b).

$$\Delta\alpha_i = \eta_i \frac{\partial L_d}{\partial \alpha_i} = \eta_i \left( y_i - \varepsilon - \sum_{j=1}^{l}(\alpha_j - \alpha_j^*)K(x_j, x_i) \right) = \quad (8a)$$
$$\eta_i(y_i + \varepsilon - f_i) = -\eta_i(E_i + \varepsilon),$$

$$\Delta\alpha_i^* = \eta_i \frac{\partial L_d}{\partial \alpha_i^*} = \eta_i \left( -y_i - \varepsilon + \sum_{j=1}^{l}(\alpha_j - \alpha_j^*)K(x_j, x_i) \right) = \quad (8b)$$
$$\eta_i(-y_i - \varepsilon + f_i) = \eta_i(E_i - \varepsilon),$$

Where $y_i$ is the measured value for the input $x_i$, ϵ is the prescribed insensitivity zone, and $E_i = f_i - y_i$ stands for the difference between the regression function f at the point $x_i$ and the desired target value $y_i$ at this point.

Another version of the learning, accounting for geometry is provided in equation (9a). For the $\alpha_i^*$ multipliers, the value of the gradient is shown in equation (9b) and the update value for $\alpha_i$ shown in equation (10a), with an alternative representation in equation (10b).

$$\frac{\partial L_d}{\partial \alpha_i} = -K(x_i, x_i)\alpha_i^* + y_i - \varepsilon - f_i = -(K(x_i, x_i)\alpha_i^* + E_i + \varepsilon) \quad (9a)$$

$$\frac{\partial L_d}{\partial \alpha_i^*} = -K(x_i, x_i)\alpha_i + E_i - \varepsilon. \quad (9b)$$

$$\Delta\alpha_i = \eta_i \frac{\partial L_d}{\partial \alpha_i} = -\eta_i(K(x_i, x_i)\alpha_i^* + E_i + \varepsilon), \quad (10a)$$

$$\alpha_i \leftarrow \alpha_i + \Delta\alpha_i = \alpha_i + \eta_i \frac{\partial L_d}{\partial \alpha_i} = \alpha_i - \eta_i(K(x_i, x_i)\alpha_i^* + E_i + \varepsilon) \quad (10b)$$

If the optimal value for the learning rate $\eta_i = 1/K(x_i, x_i)$ is chosen, the KA, i.e., the gradient ascent learning, is defined in equation (11a) and the update rule for $\alpha_i^*$ is defined in equation (11b).

$$\alpha_i \leftarrow \alpha_i - \alpha_i^* - \frac{E_i + \varepsilon}{K(x_i, x_i)} \quad (11a)$$

$$\alpha_i^* \leftarrow \alpha_i^* - \alpha_i + \frac{E_i - \varepsilon}{K(x_i, x_i)} \quad (11b)$$

After each iteration step, the dual variables $\alpha_i$ and $\alpha_i^*$ are clipped between zero and C, $(0 < \alpha_i < C, 0 < \alpha_i^* < C)$, according to equations (12a) and (12b).

$$\alpha_i \leftarrow \min(\max(0, \alpha_i), C) \ (i=1,I), \quad (12a)$$

$$\alpha_i^* \leftarrow \min(\max(0, \alpha_i^*), C) \ (i=1,I). \quad (12b)$$

The learning can also be performed by using the successive over-relaxation algorithm with clipping accounting in this way the constraints related to equation (7). Other techniques in searching for relevant points (basis or support vectors) may also be used (such as nonnegative conjugate-gradient). The particular learning process selected to be used with the present invention may vary depending on the particular processing requirements and personal preference.

By way of example, a learning machine trained on the first sixteen coefficients of R1' plotted in FIG. 6 with an error set to 10 and Gaussian width set to 1, selects the basis vectors and associated weights shown in Table 1.

TABLE 1

| Basis Vectors | 1 | 5 | 6 | 9 | 12 | 14 | 15 |
|---|---|---|---|---|---|---|---|
| Weights | 71.29 | 23.44 | 18.29 | 0.60 | 1.95 | 5.91 | 21.97 |

The outputs of the learning process, which are in the form of basis vectors and their weights, are recorded (step 24). One set of basis vectors, their weights, the DC components and the inversion bits are stored for each block of the original image and collectively these define the estimation of the original image that has resulted from the compression process of the present invention.

In order to reconstruct the image from the compressed data, the above described process is reversed. The basis vectors and inversion data are used to determine the DCT coefficients and then the IDCT is applied to reach the image.

Figure 7:
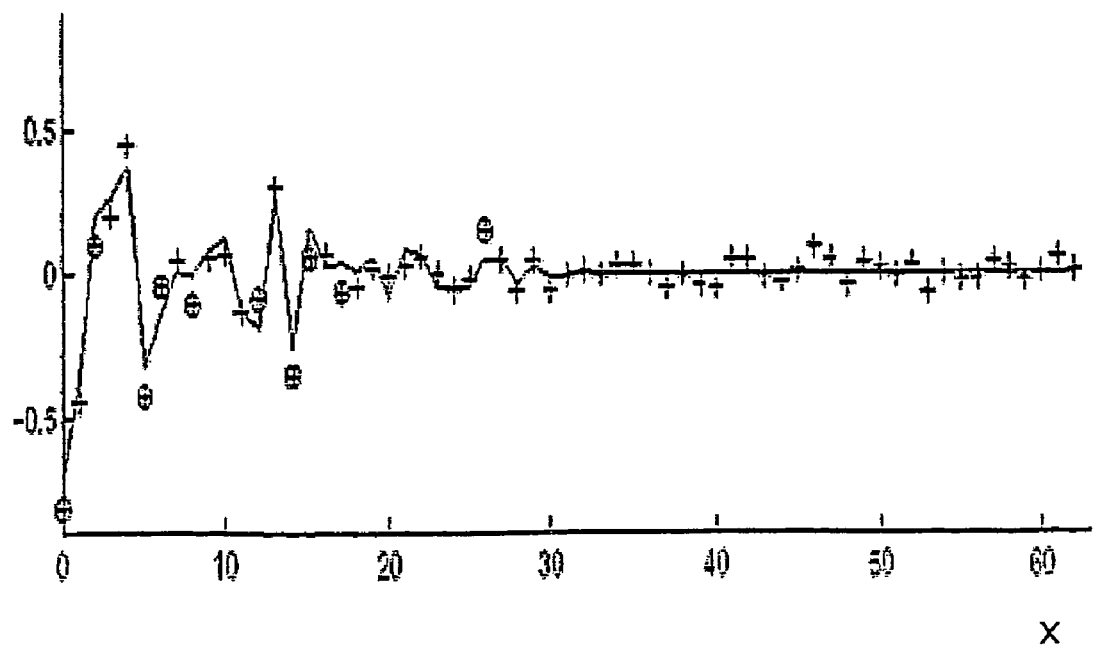
FIG. 7: Shows the reconstructed coefficients resulting from learning machine training applied to the function shown in FIG. 6.
Figure 8:
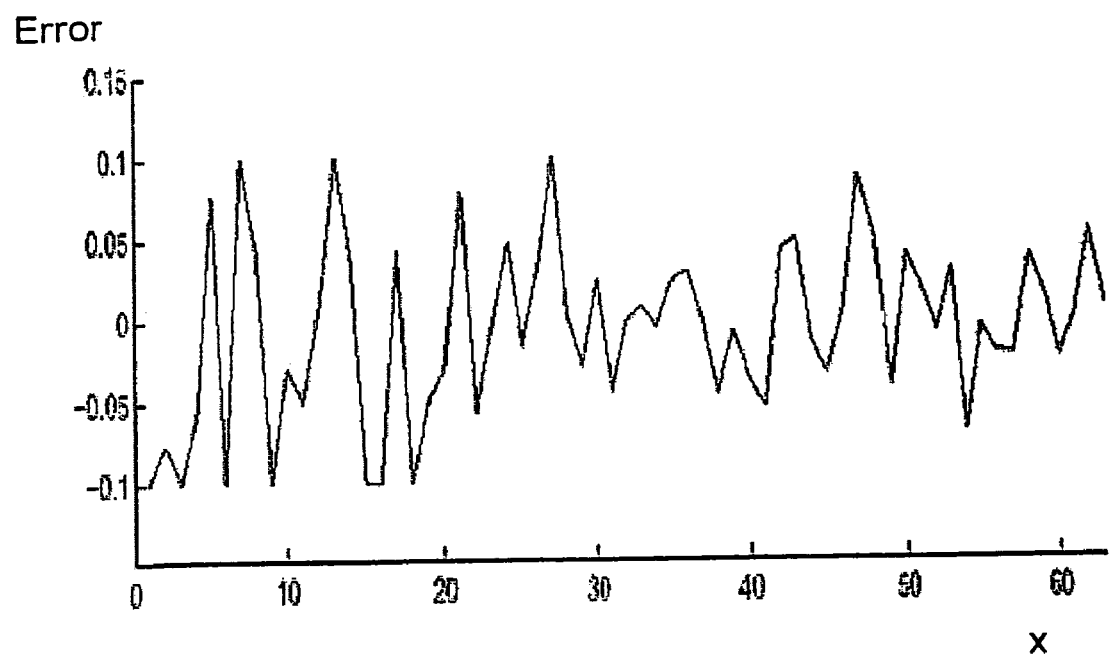
FIG. 8: Shows the error between the input function and its estimate resulting from data compressed using the results of learning machine training shown in FIG. 7.

FIG. 7 shows the resulting estimate of the values of the DCT coefficients of the entire row R1' plotted in FIG. 6 using a learning machine training process. The input points to the learning machine are the same as the DCT coefficients defining the function in FIG. 5 and are represented by a cross (+) and the resulting basis vectors by a circle (○). With an error set to +/−0.1, 10 basis vectors are required. This can be loosely interpreted as a compression ratio of 63:10 or 6.3:1. FIG. 8 shows the error of the estimation, i.e. the difference between the plot of FIG. 1A and the plot of FIG. 2A, with the total accumulated error being 271.

Figure 9:
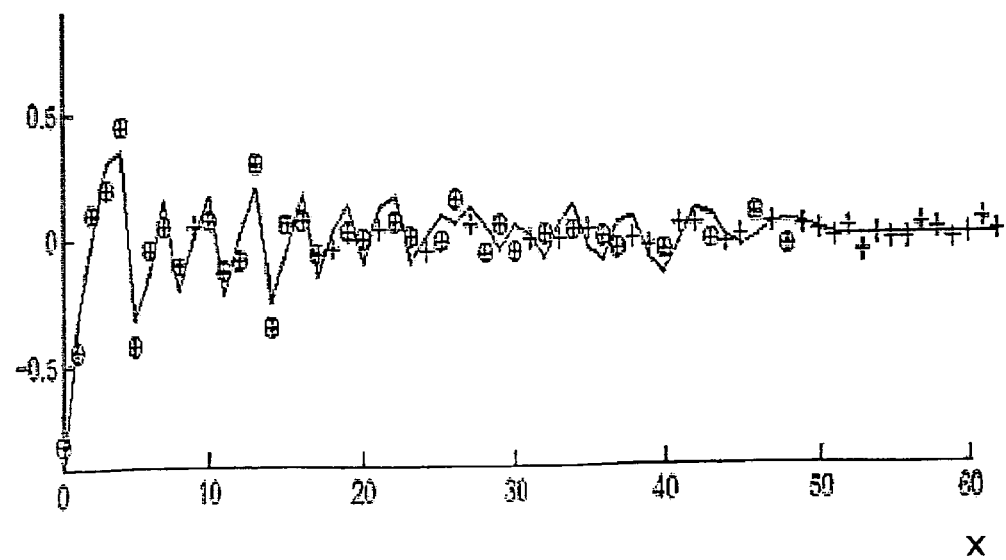
FIG. 9: Shows the results of learning machine training applied to the function shown in FIG. 5.
Figure 10:
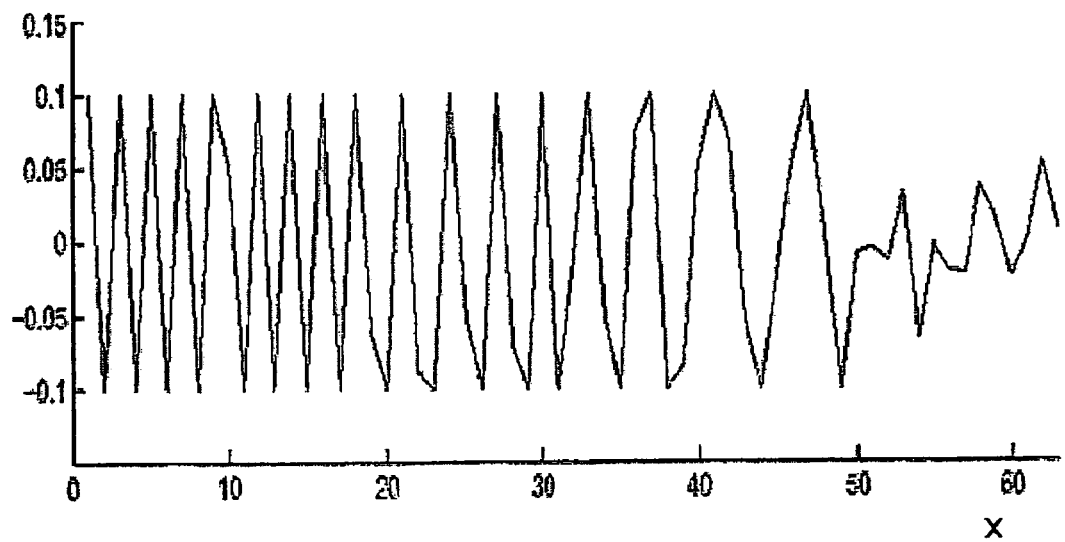
FIG. 10: Shows the error between the input function and its estimate resulting from data compressed using the results of learning machine training shown in FIG. 9.

By way of comparison, FIG. 9 shows the resulting estimate of the values of the DCT coefficients of the entire row R1 plotted in FIG. 5 using the a learning machine training process with the same error. In this case 34 basis vectors are required. This can be loosely interpreted as a compression ratio of 63:34 or approximately 1.85:1, a decrease in compression by a factor of around 3.5. FIG. 10 shows the error of the estimation, the total accumulated error being 452.

Although the process of inverting portions of a function about a predetermined value prior to applying a learning process to the function has been described herein above as part of an overall process to compress image information, those skilled in the relevant arts will appreciate that the inversion process may be used for the estimation of any function using a learning process. The function may define any information from which an estimate needs to be formed using a learning process, including functions formed from data in the spatial, time or frequency domains.

The extent of compression may be controlled by setting a number of variables in the above described algorithms. For example, the size of the $\epsilon$-insensitivity zone, the quantization step size for both the AC and DC components, whether or not the DC components are included with the AC components or not, whether selected inversion bits are discarded are all configurable variables that allow the compression to be increased or decreased. Establishing a required combination of these configurable variables and any other variables that may be used is considered within the capability of the ordinarily skilled person in the relevant arts and therefore will not be detailed herein.

In addition to the above configuration, advantage may be taken of the tendency of the magnitude of the frequency components to diminish in an image with higher frequency and that the higher frequency components are less visible to the eye to further reduce the size, of the compressed image data. As can be seen from FIGS. 5 and 7, the largest magnitude DCT coefficients are generally the first sixteen coefficients. Therefore, an additional configuration step may be to discard the seventeenth to sixty-third coefficients (step 17A). As shown in Table 1 above, this reduces the number of basis vectors from ten to seven, leading to a compression ratio of 63:7 or 9:1. The more coefficients discarded, the higher the compression, with a penalty in recovered image quality.

In order to be useful, the data resulting from the compression will need to be communicated or stored. Where a weight has no corresponding basis vector, the value of that weight is set to zero (step 22). Therefore, taking the first 16 coefficients of the row R1' and the associated basis vectors and weights in Table 1, then the resulting data defining the basis vectors and weights (C1), represented in decimal numbers for clarity would be:

$$C1 = [71.29, 0, 0, 0, 23.44, 18.29, 0, 0, 0.60, 0, 0, 1.95, 0, 5.91, 21.97]$$

The weights may then be quantized (step 23). Quantization may be performed by identifying the maximum and minimum weight values across all blocks for the image and dividing these into a predefined number of quantization steps. For example, if the minimum weight is 0 and the maximum is 90 and five quantization levels are required, then the weights can only take the values {9, 27, 45, 63, 81}. The minimum step size, in this case 9 may be subtracted from each weight after quantization.

The weights may be combined with the basis vectors and matched with the DCT coefficients. This involves adding a constant to each of the basis vector weights (step 24), the constant selected to make all basis vector weights positive and non-zero. The sum of the constant and the basis vector weights may be termed the shifted basis vectors. The shifted basis vectors are then inverted or not inverted depending on the inversion bit (step 25). For example, if the inversion bit is a "1", the basis vector weight may be inverted to the absolute value, but negative. Therefore, a series of positive and negative numbers created in this way together with information defining the selected scalar defines the basis vectors, their weights and the inversion bits, as the position in the data stream indicates the basis vector (centre of the Gaussian), the absolute value less the constant defines the weight of the basis vector and the sign of the number in the series defines the inversion bit.

For example taking C1 referred to herein above, each coefficient takes the closest value to the quantization steps 9, 27, 45, 63, 81 If any of the quantization levels are negative, then a positive number of equal magnitude must be added to all weights to ensure that they are positive. After combining the result with the inversion bits, C2 results.

$$C2 = [-81, 9, 9, 9, -27, -27, 9, -9, 9, 9, -9, -9, 9, -9, 27]$$

To increase compression, where the inversion bit does not correspond to a weight (all the values 9 or −9 in C2), the inversion bit may be discarded (step 26). The discarding of the inversion bit means that the positive value of the weight is no longer necessary and so the weights are reset to zero, resulting in C3. This introduces a small error when the image is decompressed, but increases compression.

$$C3 = [-81, 9, 9, 9, -27, -27, 9, 9, 9, 9, 9, 9, 9, 9, 27]$$

Following step 20 and/or step 26 results in a large number of zeros in the data. Therefore, the weights may be run length encoded and/or entropy encoded (step 27) to further reduce the size of the data to be stored/transmitted. This data is recorded (step 28). If the DC components were removed from the matrix of each block and entropy encoded, the combination of the entropy encoded DC components, the encoded C3, the minimum quantization level and scalar added to C2 represents the compressed image data.

In FIG. 2, the primary steps of the compression process, steps 10, 12, 17, 21 and 28 are indicated down the left hand side, with solid arrows joining the steps. The other steps indicated by dashed arrows represent optional features of the compression process of the present invention and the various paths that may be followed each represent a possible implementation of the invention. Those skilled in the relevant arts will appreciate that other optional paths through the flowchart in FIG. 2 and other steps not shown in FIG. 2 may be added without departing from the present invention.

Results

To objectively measure image quality, the signal to noise ratio (SNR) is used. The SNR is calculated using equation (7).

$$SNR = 20 \log \left[ \frac{1}{width \times height} \times \frac{\sum_{ij} Original\_Image_{ij}}{\sum_{ij} (Original\_Image_{ij} - Recovered\_Image_{ij})} \right] \quad \text{equation (7)}$$

Figure 12:
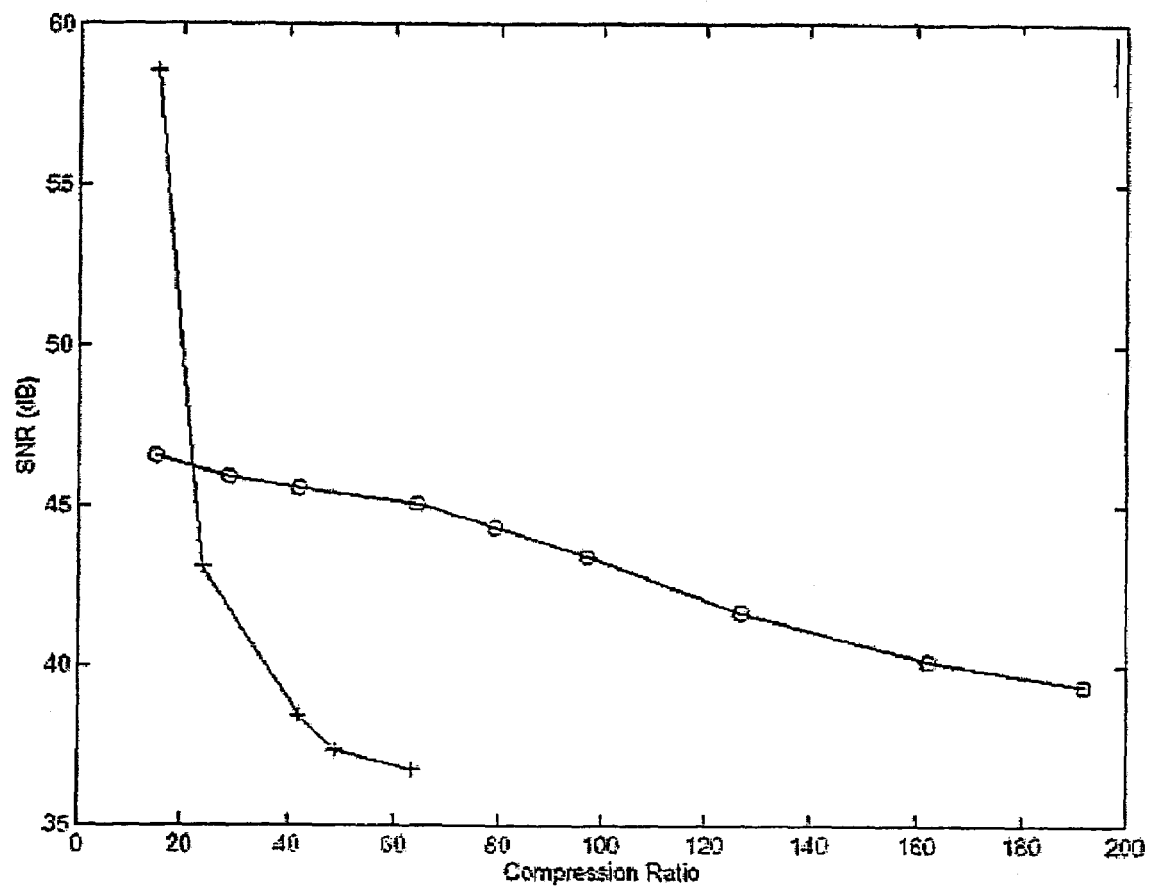
FIG. 12: Shows a plot of compression ratio versus signal-to-nose ratio for the compression method of the present invention in comparison to JPEG compression.

Results using the process described above and illustrated in FIG. 2 against the benchmark 512×512 'Lena' image are shown in FIG. 12 in comparison with the baseline JPEG algorithm. In FIG. 12, the SNR for the JPEG algorithm is referenced by line crosses (+) and the compression algorithm of the present invention by circles (○). The JPEG algorithm performs better than the algorithm of the present invention for compression ratios up to 22:1 (on this particular image). For compression ratios beyond this, the algorithm of the present invention produces higher quality images for the same compression ratio.

The baseline JPEG algorithm could not compress the 512×512 Lena image greater than 64:1. The algorithm of the present invention achieved a compression ratio of 192:1 and still achieved better image quality than the image compressed using JPEG at 64:1.

Figure 13:
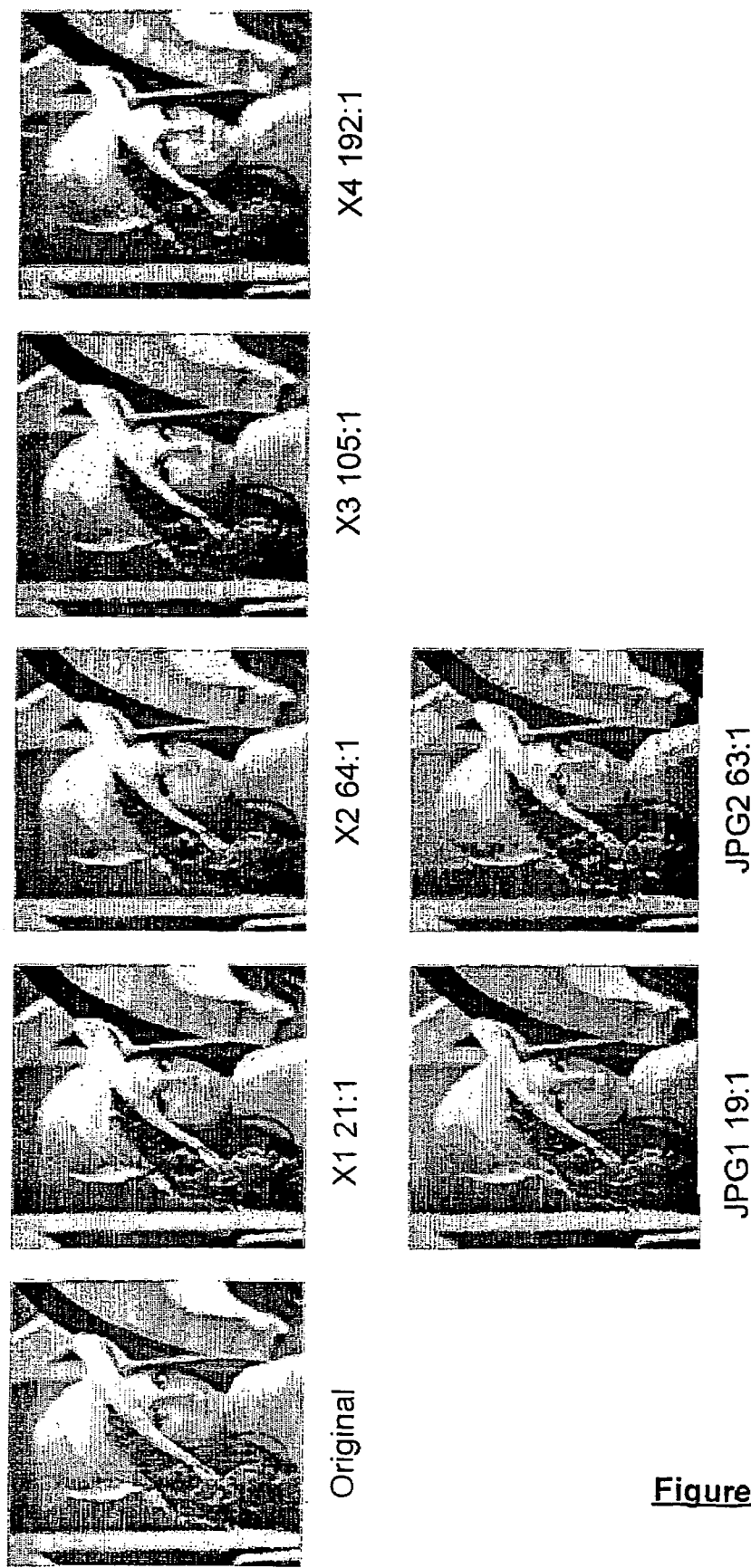
FIG. 13: Shows examples of reconstructed images from compressed image data formed by the method of the present invention and by using the JPEG compression algorithm.

The decompressed images are shown in FIG. 13 for subjective comparison of the algorithm of the present invention compared with the baseline JPEG algorithm. The original image was 512×512 pixels. The images resulting from decompression of compressed data formed according to the present invention at various compression ratios are referenced X1 to X4 and those resulting from decompression of JPEG data JPG1 and JPG2.

Where in the foregoing description reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

The invention claimed is:

1. A method of producing compressed data including the steps of:
    a) receiving input data to be compressed;
    b) transforming said input data into a sum of basis functions multiplied by a corresponding set of coefficients;
    c) forming a function from said set of coefficients;
    d) estimating said function using a learning process and recording the resulting estimate;
    wherein said estimate defines the compressed data, and includes a selection of said basis functions, said selection being determined by the learning process to meet a required accuracy of approximation, whereby the required accuracy of approximation is defined by an insensitivity zone within which the estimate is permitted to deviate.

2. The method of claim 1, further including subdividing input data received in step a) into a number of portions and performing steps b) through d) on each of said portions.

3. The method of claim 2, wherein the step of forming a function from said set of coefficients includes first removing a DC component from each said portion and recording the DC components as part of the compressed data.

4. The method of claim 3, further including encoding said DC components prior to recording them as part of the compressed data.

5. The method of claim 1 wherein said step of forming a function includes:
    i) defining a first function as a series of said coefficients alternating about a predetermined value;
    ii) creating a second function by inverting identified portions of the first function on one side of the predetermined value and recording inversion information defining the portions that have been inverted;
    wherein said second function defines the function to be estimated in step d).

6. The method of claim 5, wherein the learning process identifies a series of basis vectors and wherein the method further includes associating each basis vector with a corresponding coefficient in said function.

7. The method of claim 6 further including discarding the inversion information for any coefficient that does not have an associated basis vector.

8. The method of claim 7, further including discarding weights calculated by the learning process that do not have an associated basis vector.

9. The method of claim 6 further including discarding the inversion information for any coefficient where at least one of its absolute value and reconstructed value is less than a predetermined magnitude.

10. The method of claim 6 including storing the basis vectors as a data series, wherein the position of a value in the data series defines the basis vector and the value defines the basis vector's weight.

11. The method of claim 10, including shifting the values in the data series so that they have the same sign and are non-zero, recording the value by which the values have been shifted as part of the compressed data and combining the basis vectors with the inversion information by changing the sign of the values dependent on the inversion information.

12. The method of claim 10 including encoding the data series using entropy encoding.

13. The method of claim 1, wherein the step of transforming said input data into a sum of basis functions multiplied by a corresponding set of coefficients includes applying the discrete cosine transform to the input data.

14. The method of claim 1, wherein the input data defines a two-dimensional.

15. A method of creating information defining an estimate of a function, the method including:
  i) receiving input information including a number of values defining a first function, wherein the first function is to be estimated;
  ii) creating a second function by inverting identified portions of the first function on one side of a predetermined value and recording inversion information defining the portions that have been inverted;
  iii) estimating said second function using a learning process and recording information defining a resulting estimate;
  wherein the resulting estimate and inversion information are collectively the information defining an estimate of the first function, and the estimate includes a selection of said values, said selection being determined by the learning process to meet a required accuracy of approximation, whereby the required accuracy of approximation is defined by an insensitivity zone within which the estimate is permitted to deviate.

16. The method of claim 15, wherein the learning process computes a series of basis vectors and the method includes associating each basis vector with a corresponding value in said second function.

17. The method of claim 16 further including discarding the inversion information for any value that does not have an associated basis vector.

18. The method of claim 17, further including discarding weights computed by the learning machine training that do not have an associated basis vector.

19. The method of claim 16 further including discarding the inversion information for any coefficient where one or both of its absolute value and reconstructed is less than a predetermined magnitude.

20. The method of claims 16 including storing the basis vectors as a data series, wherein the position of a value in the data series defines the basis vector and the value defines the basis vector's weight.

21. The method of claim 20, including shifting the values in the data series so that all the values have the same sign and are non-zero, recording the value by which the values have been shifted as part of the information defining an estimate of the first function and combining the basis vectors with the inversion information by changing the sign of the values dependent on the inversion information.

22. The method of claim 20 including encoding the data series using entropy encoding.

23. A computerized apparatus for producing compressed data, the computerized apparatus including receiving means to receive input data to be compressed and processing means operable to:
  a) transform said input data into a sum of basis functions multiplied by a corresponding set of coefficients;
  b) form a function from said set of coefficients;
  c) estimate said function using a learning process;
  wherein said estimate defines the compressed data, and includes a selection of said basis functions, said selection being determined by the learning process to meet a required accuracy of approximation, whereby the required accuracy of approximation is defined by an insensitivity zone within which the estimate is permitted to deviate.

24. The computerised apparatus of claim 23 wherein the processing means is operable to form a function by:
  i) defining a first function as a series of said coefficients alternating about a predetermined value;
  ii) creating a second function by inverting identified portions of the first function on one side of the predetermined value and recording inversion information defining the portions that have been inverted;
wherein said second function defines the function to be estimated in step c).

25. The computerised apparatus of claim 23 when used to compress image or sound information, wherein the processing means is operable to transform coefficients.

26. An computerized apparatus for creating information defining an estimate of a function, the computerized apparatus including receiving means for receiving input information including a number of values defining a first function, wherein the first function is to be estimated and processing means operable to:
  i) create a second function by inverting identified portions of the first function on one side of a predetermined value and recording inversion information defining the portions that have been inverted;
  ii) estimate said second function using a learning process and recording information defining a resulting estimate;
  wherein the resulting estimate and inversion information are collectively the information defining an estimate of the first function, and the estimate includes a selection of said values, said selection being determined by the learning process to meet a required accuracy of approximation, whereby the required accuracy of approximation is defined by an insensitivity zone within which the estimate is permitted to deviate.

27. A computer readable medium containing a software product for producing compressed data, the software product including an instruction set including instructions to cause a processing means or a combination of processing means to:
  a) transform said input data into a sum of basis functions multiplied by a corresponding set of coefficients;
  b) form a function from said set of coefficients;
  c) estimate said function using a learning process;

wherein the estimate defines the compressed data, and includes a selection of said basis functions, said selection being determined by the learning process to meet a required accuracy of approximation, whereby the required accuracy of approximation is defined by an insensitivity zone within which the estimate is permitted to deviate.

28. A computer readable medium containing a software product for determining an estimate of a function, the software product including an instruction set including instructions to cause a processing means or a combination of processing means to:
 i) receive information defining a first function, wherein the first function is to be estimated;
 ii) create a second function by inverting identified portions of the first function on one side of a predetermined value and recording inversion information defining the portions that have been inverted;
 iii) estimate said second function using a set of parameters than number less than the number of values in said input information and recording information defining the resulting estimate;
 wherein the resulting estimate and inversion information are collectively the information defining an estimate of the first function, and the estimate includes a selection of said values, said selection being determined by the learning process to meet a required accuracy of approximation, whereby the required accuracy of approximation is defined by an insensitivity zone within which the estimate is permitted to deviate.

29. A method of compressing data comprising the steps of:
 a) receiving input data and subdividing it into a plurality of portions; and for each portion:
 b) transforming said input data into a sum of basis functions multiplied by a corresponding set of coefficients;
 c) removing DC components and recording one of the removed DC components and a compressed form of the DC components;
 d) defining a first function as a series of said coefficients alternating about a predetermined value;
 e) creating a second function by inverting identified portions of the first function on one side of the predetermined value and recording inversion information defining the portions that have been inverted;
 f) estimating said second function using a learning process and recording the resulting estimate;
 wherein said estimate defines the compressed data and recorded DC components, and includes a selection of said basis functions, said selection being determined by the learning process to meet a required accuracy of approximation, whereby the required accuracy of approximation is defined by an insensitivity zone within which the estimate is permitted to deviate.

30. A method of producing compressed data comprising the steps of:
 a) receiving input data to be compressed;
 b) transforming said input data into a sum of basis functions multiplied by a corresponding set of coefficients;
 c) forming a function from said set of coefficients;
 d) estimating said function using a learning process involving associating a series of weighted basis vectors with said function and recording the resulting estimate;
 wherein the estimate formed in step d) defines the compressed data, and includes a selection of said basis functions, said selection being determined by the learning process to meet a required accuracy of approximation, whereby the required accuracy of approximation is defined by an insensitivity zone within which the estimate is permitted to deviate.

31. The method of claim 30, including storing the basis vectors as a data series and encoding the data series using entropy encoding.

* * * * *

UNITED STATES PATENT AND TRADEMARK OFFICE
CERTIFICATE OF CORRECTION

PATENT NO.       : 7,469,065 B2
APPLICATION NO.  : 10/495607
DATED            : December 23, 2008
INVENTOR(S)      : Vojislav Kecman It is certified that error appears in the above-identified patent and that said Letters Patent is hereby corrected as shown below:

Column 17:

Claim 14, line 21:

Delete "two-dimensional" and insert --two-dimensional image--

Column 18:

Claim 25, line 37:

Delete "transform coefficients" and insert --transform image information from the spatial domain to the frequency domain to create said set of coefficients--

Column 19:

Claim 29, line 33:

Should read:

"portions;
and for each portion;
b) transforming said input data into a sum of basis functions multiplied by a corresponding set of coefficients;"

Signed and Sealed this

Fourteenth Day of April, 2009

JOHN DOLL
*Acting Director of the United States Patent and Trademark Office*